US008606502B2

(12) United States Patent
Hixson

(10) Patent No.: US 8,606,502 B2
(45) Date of Patent: Dec. 10, 2013

(54) NAVIGATION DEVICE AND METHOD

(76) Inventor: Stephen Price Hixson, Lancaster, MA (US)

(*) Notice: Subject to any disclaimer, the term of this patent is extended or adjusted under 35 U.S.C. 154(b) by 315 days.

(21) Appl. No.: 12/736,878

(22) PCT Filed: Dec. 29, 2008

(86) PCT No.: PCT/EP2008/068322
§ 371 (c)(1),
(2), (4) Date: Jan. 11, 2011

(87) PCT Pub. No.: WO2010/075877
PCT Pub. Date: Jul. 8, 2010

(65) Prior Publication Data
US 2011/0118977 A1 May 19, 2011

(51) Int. Cl.
*G01S 1/00* (2006.01)
(52) U.S. Cl.
USPC ............................ 701/408; 701/532; 340/990
(58) Field of Classification Search
USPC ................... 701/408, 532, 533, 418, 527; 340/995.19, 990
See application file for complete search history.

(56) References Cited

U.S. PATENT DOCUMENTS

| | | | |
|---|---|---|---|
| 6,046,689 A | | 4/2000 | Newman |
| 7,254,481 B2* | | 8/2007 | Yamada et al. ............ 701/426 |
| 2008/0059222 A1 | | 3/2008 | Zhang |
| 2008/0071466 A1 | | 3/2008 | Downs et al. |

FOREIGN PATENT DOCUMENTS

AU 755096 12/2002

OTHER PUBLICATIONS

International Search Report.

* cited by examiner

*Primary Examiner* — Thomas Black
*Assistant Examiner* — Luke Huynh

(57) ABSTRACT

A navigation device includes a locator for determining a location of the navigation device, a processor, an audio output device and/or a display controllable by the processor, and a store for map data and historical data. The historical data includes historical information about a location and a location identifier identifying the location. The processor is arranged to control the audio output device and/or display to convey the historical information as an audio and/or visual output in response to the processor determining from the locator that the navigation device is in the vicinity of the location identified by the location identifier.

15 Claims, 8 Drawing Sheets

NAVIGATION DEVICE AND METHOD

FIELD OF THE INVENTION

This invention relates to navigation devices. Illustrative embodiments of the invention relate to portable navigation devices (so-called PNDs), in particular PNDs that include Global Navigation Satellite System (GNSS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another. However, there is a need to increase the functionality of the navigation device to increase the utility of the navigation device to the user.

SUMMARY OF THE INVENTION

According to a first aspect of the invention there is provided a navigation device comprising:
 a locator for determining a location of the navigation device;
 a processor; and
 an audio output device and/or a display controllable by the processor;
 a store for map data and historical data, said historical data comprising historical information about a location and a location identifier identifying the location,
 wherein said processor is arranged to control the audio output device and/or display to convey the historical information as an audio and/or visual output in response to the processor determining from the locator that the navigation device is in the vicinity of the location identified by the location identifier.

In this way, the navigation device automatically provides historical information to a user when the navigation device is in the proximity of a historical location of interest, which may increase the utility of the navigation device to the user. For example, the user may use the navigation device for historical tours, tourist trips or simply to provide entertainment during a journey.

A technical problem solved by the invention is how to automatically provide information (historical information) automatically to a user at a relevant time. The invention solves this problem through the technical features of the store being arranged (for example, having a data structure) for storing historical data comprising historical information and a location identifier identifying the historical location of interest and the processor being arranged to control the audio output device and/or display to convey the historical information as an audio and/or visual output in response to the processor determining from the locator that the navigation device is in the vicinity of the location identified by the location identifier. These technical features result in a technical effect of an audio and/or visual output being automatically produced when in the vicinity of the location.

It will be understood that the term "historical information" means information about the history of a location.

The navigation device may comprise an input interface, for example a touch screen.

The processor may be arranged to map position fixes obtained via the locator to the map data (so called map matching). For example, a set of position fixes may be obtained from the locator and the set of position fixes may be matched to the nearest navigable route, for example road, path, canal, etc, that approximately corresponds to that set of position fixes. The location identifier of the historical data may identify a location on the map data and the processor may determine that the navigation device is in the vicinity of the location identified by the location identifier by map matching the position fixes of the locator to the map data, determining a current location of the navigation device on the map data and determining whether the current location on the map data is in the vicinity of the location on the map data identified by the location identifier of the historical data.

The locator may be a Global Navigation Satellite System (GNSS) receiver, such as a GPS receiver, and the position fixes GNSS position fixes.

The navigation device may be considered to be in the vicinity of the location identified by the location identifier if the navigation device is at the same location on a navigable route as the location identified by the location identifier.

Alternatively or additionally, the navigation device may be considered to be in the vicinity of the location identified by the location identifier if the navigation device is within a predetermined distance of the location identified by the location identifier. The predetermined distance may be fixed or alternatively, the predetermined distance may be variable. For example, a user may set the predetermined distance. Accordingly, in one embodiment, the processor is arranged to cause the display to display a request for the predetermined distance and configure the input interface to receive a selection of a predetermined distance. Such flexibility may be desirable as it allows the user to configure the navigation device as is appropriate for the speeds of travel. For example, the user may wish the historical information to be conveyed earlier if the user is travelling faster, such as in a car rather then on foot, or based on how long the user wants to spend in the vicinity of a historical location.

In another embodiment, the navigation device may be considered to be in the vicinity of the location identified by the location identifier if the navigation device is within a predetermined time of the location identified by the location identifier as determined from the current speed of the navigation device.

Alternatively the navigation device may be considered to be in the vicinity of the location identified by the location identifier if the location identified by the location identifier is considered to be in view from a current location of the navigation device. For example, the location identifier may identify from which locations on navigable routes the historical location can be seen and the processor is arranged to control the audio output device and/or display to convey the historical information when the navigation device is at one of these locations on the navigable routes.

The historical data may comprise a type identifier identifying one or more attributes (other than location) of the historical location, for example type of historical site, e.g. historical building, battlefield, geological, archaeological; period of notable historical event, e.g. middle ages, Roman empire; prehistoric, 1800s; type of historical event, e.g. religious, scientific, technological, art, political, military, language; or other suitable attribute. The processor may be arranged to control the audio output device and/or display to convey historical information based on the type identifier associated with that historical information. For example, only historical information having a particular attribute may be conveyed to the user. The processor may be arranged to cause the display to display a request for a selection of one or more attributes of historical sites that is of interest to the user and configure the input interface to receive a selection of the one or more attributes. In response to the selection, the processor may be arranged to only convey historical information having one or more, or even all, of the attributes selected by the user. In this way, the user can identify what historical sites are of interest to her/him and the navigation device only provides historical information on sites that may be of interest. This avoids the user being given unwanted information.

In one embodiment, the processor is arranged to determine a navigable route using the map data.

The input interface may be configured to enable a user to select a destination and the processor arranged to determine a navigable route based on the selected destination. The processor may be arranged to identify historical locations in the vicinity of the planned navigable route.

Alternatively or additionally, the input interface may be configured to enable a user to select a type of historical location that she/he would like to visit and the processor is arranged to determine a navigable route based on the selected type of historical location. In this way, the user does not require knowledge of the location of the historical site or even the name of the historical site in order to obtain directions.

According to a second aspect of the invention there is provided a data carrier having stored thereon historical data comprising historical information about a location and a location identifier identifying the location on map data that is used by a navigation device to determine a navigable route.

According to a third aspect of the invention there is provided a server comprising memory having stored thereon historical data according to the second aspect of the invention, a communication link for communicating with a navigation device according to the first aspect of the invention and a processor arranged to send the historical data to the navigation device.

According to a fourth aspect of the invention there is provided a data carrier having stored thereon instructions that, when executed by a processor of a navigation device comprising:
  a locator for determining a location of the navigation device;
  an audio output device and/or a display (240) controllable by the processor; and
  a store (230) for map data and historical data, said historical data comprising historical information about a location and a location identifier identifying the location,
  causes the processor to control the audio output device and/or display to convey the historical information as an audio and/or visual output in response to the processor determining from the locator that the navigation device is in the vicinity of the location identified by the location identifier.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
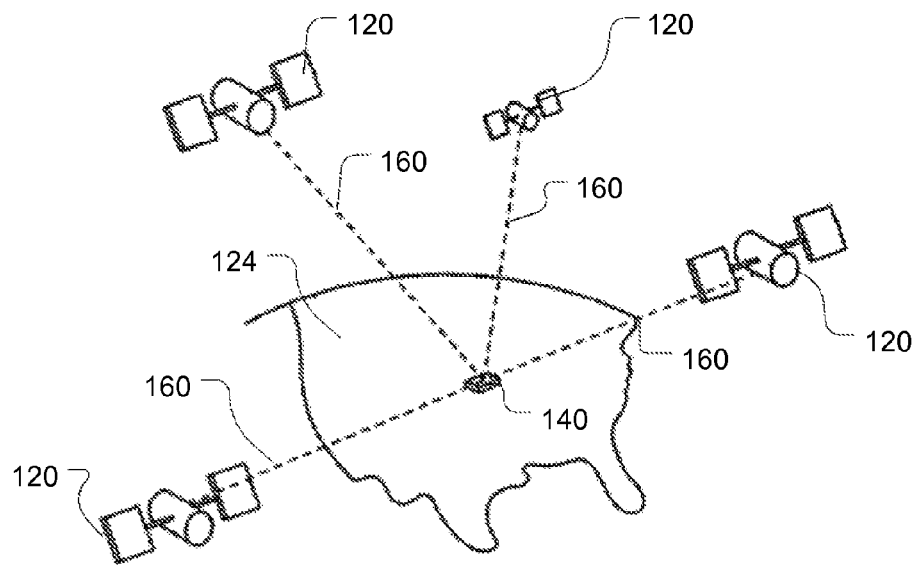
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
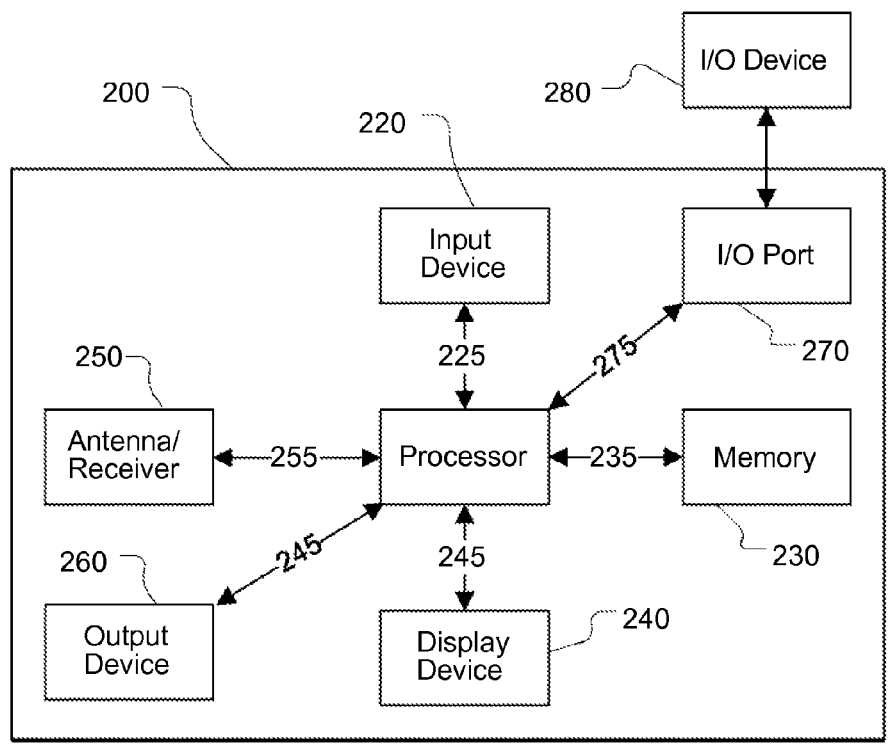
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch screen and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. The input device may be a touchscreen.

Further, the processor 210 is operably coupled to a memory resource (store) 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. Memory 230 has stored thereon map data based on which the navigation device 200 determines a navigable route and historical data, said historical data comprising historical information about a location, a location identifier identifying the location on the map data and a type identifying one or more attributes (other than location) of the historical location, for example type of historical site, e.g. historical building, battlefield, geological, archaeological; period of notable historical event, e.g. middle ages, Roman empire; prehistoric, 1800s; type of historical event, e.g. religious, scientific, technological, art, political, military, language; or other suitable attribute.

The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the Internet or any other network for example, and/or to establish a connection to a server via the Internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
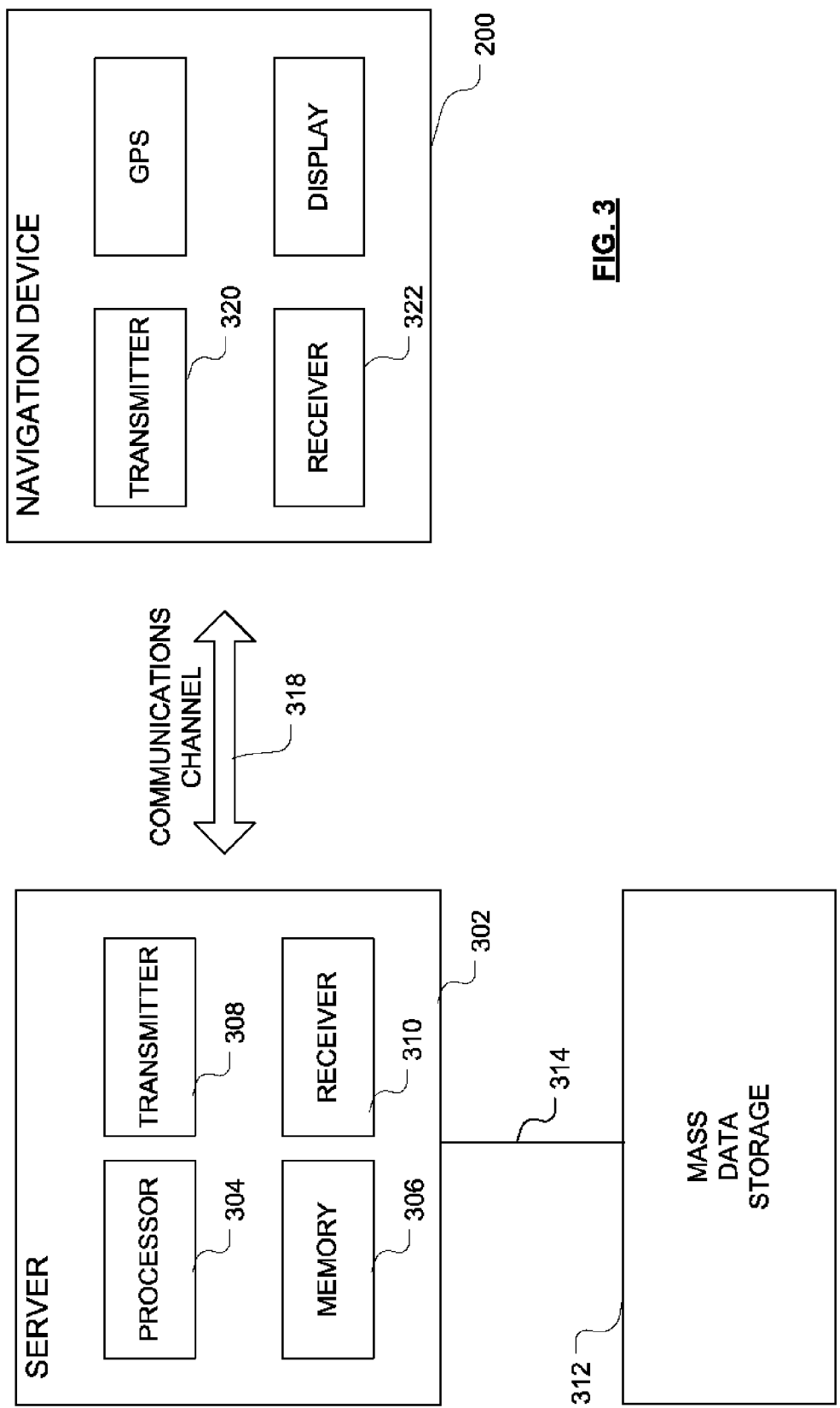
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the Internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an Internet (such as the World Wide Web) for example, can be done in a known manner. This can include use of TCP/IP layered protocol for example. The mobile device can utilize any number of communication standards such as CDMA, GSM, WAN, etc.

As such, an Internet connection may be utilised which is achieved via data connection, via a mobile phone or mobile phone technology within the navigation device 200 for example. For this connection, an Internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the Internet).

The navigation device 200 can further complete a data connection with the mobile device, and eventually with the Internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the Internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the Internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of map data that can be used by a navigation device to determine a route and historical data. Both the map data and historical data can be uploaded to a navigation device over the communication channel 318. The historical data comprises historical information about a plurality of locations, typically a text file, such as a word document, and location identifiers identifying the plurality of locations on the map data.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an Internet connection between the server 302 and the navigation device 200. Alternatively, a mobile telephone or other handheld device may establish a wireless connection to the Internet, for connecting the navigation device 200 to the server 302 via the Internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
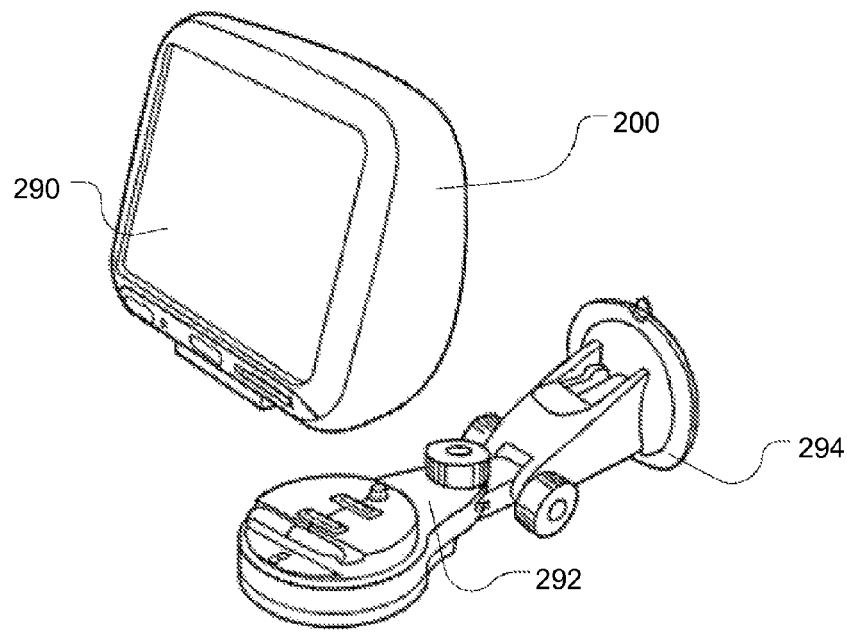
FIGS. 4A and 4B are illustrative perspective views of a navigation device.
Figure 4B:
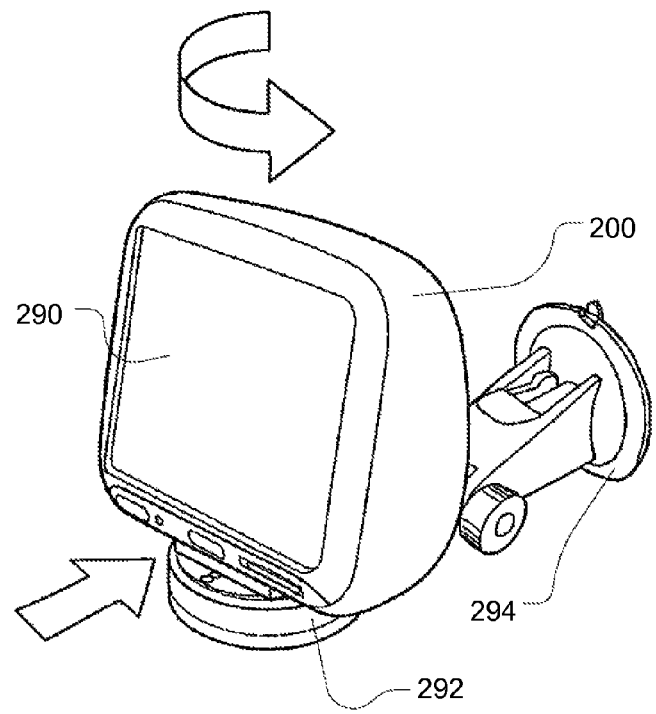

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 200 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Referring now to FIGS. 5a to 5i there is depicted a series of screenshots of the navigation device. The PND has a touchscreen interface for displaying information to a user and for accepting input to the device from the user. The screenshots show an illustrative destination location input process for a user whose home location has been set to the offices in The Hague of the European Patent Office, and who wishes to navigate to a street address in Amsterdam, The Netherlands for which they know the street name and building number.

Figure 5A:
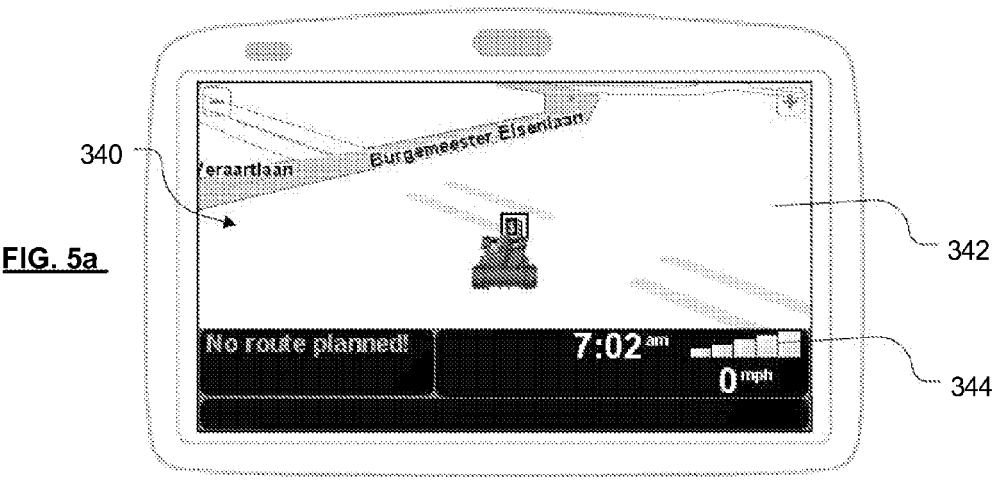
FIGS. 5a to 5i are illustrative screenshots from a PND for a destination input process.

When this user switches on their PND, the device acquires a GPS fix and calculates (in a known manner) the current location of the PND. This GPS fix is map matched (as described below) to the map data to determine a location on the map data for the navigation device. The user is then presented, as shown in FIG. 5a, with a display 340 showing in pseudo three-dimensions the local environment 342 based on the map data in which the PND is determined to be located, and in a region 344 of the display 340 below the local environment a series of control and status messages.

Figure 5B:
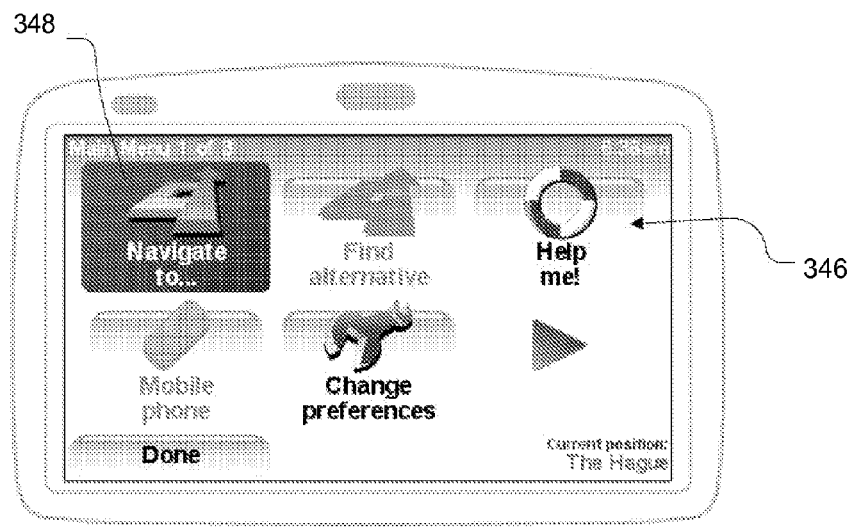

By touching the display of the local environment 342, the PND switches to display (as shown in FIG. 5b) a series of virtual buttons 346 by means of which a user can, inter alia, input a destination that they wish to navigate to.

Figure 5C:
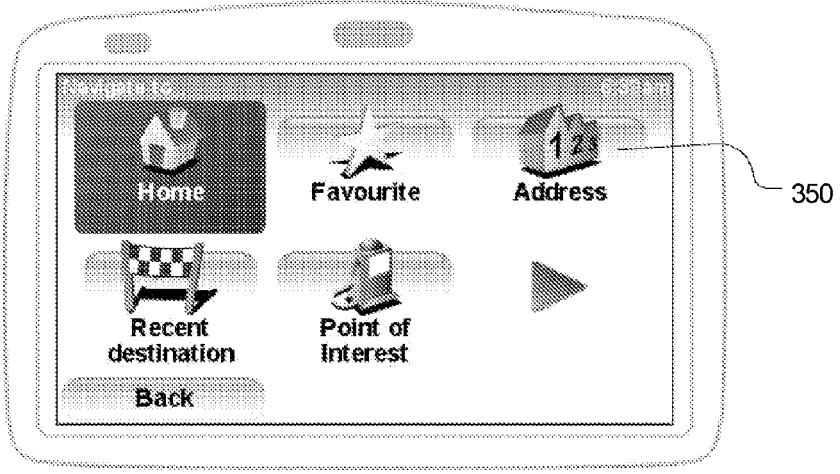

By touching the "navigate to" virtual button 348, the PND switches to display (as shown in FIG. 5c) a plurality of virtual buttons that are each associated with a different category of selectable destinations. In this instance, the display shows a "home" button that if pressed would set the destination to the stored home location. However, in this instance as the user is already at their home location (namely the EPO's offices in the Hague) selecting this option would not cause a route to be generated. The "favourite" button, if pressed, reveals a list of destinations that the user has previously stored in the PND and if one of these destinations is then selected the destination for the route to be calculated is set to the selected previously stored destination. The "recent destination" button, if pressed, reveals a list of selectable destinations held in the memory of the PND and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as cash machines, petrol stations or tourist attractions for example, that have been pre-stored in the device as locations that a user of the device might want to navigate to. The "arrow" shaped virtual button opens a new menu of additional options, and the "address" button 350 commences a process by which the user can input the street address of the destination that they wish to navigate to.

Figure 5D:
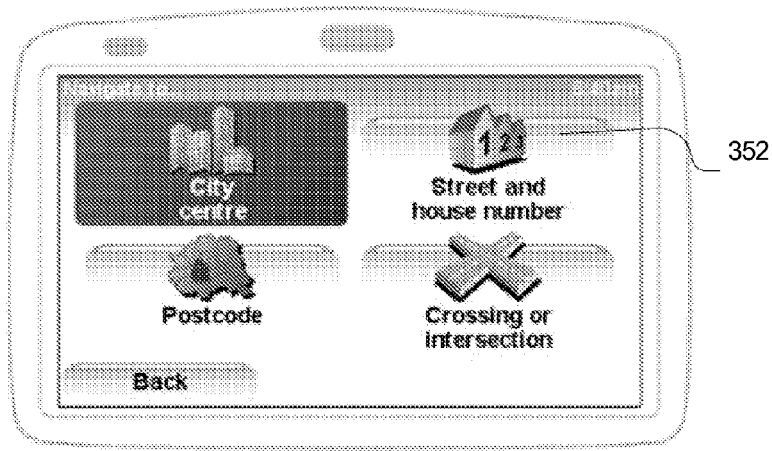

Since the user, in this example, knows the street address of the destination that they wish to navigate to, it is assumed that this "address" button is operated (by touching the button displayed on the touchscreen), whereupon (as shown in FIG. 5d) the user is presented with a series of address input options—in particular for address input by "city centre", by "postcode", by "crossing or intersection" (for example a junction of two roads) and by "street and house number".

Figure 5E:
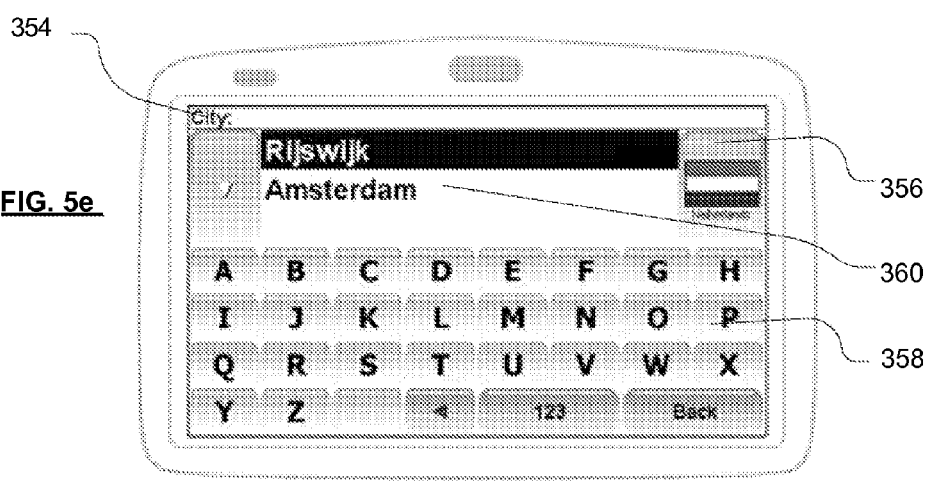

In this example the user knows the street address and house number of the destination and hence selects the "street and house number" virtual button 352 whereupon the user is then presented, as shown in FIG. 5e, a prompt 354 to enter the name of the city that they wish to navigate to, a flag button 356 by means of which the user can select the country in which the desired city is located, and a virtual keyboard 358 that may be operated by the user, if necessary, to input the name of the destination city. In this instance the user has previously navigated to locations in Rijswijk and Amsterdam, and the PND therefore additionally provides the user with a list 360 of selectable cites.

Figure 5F:
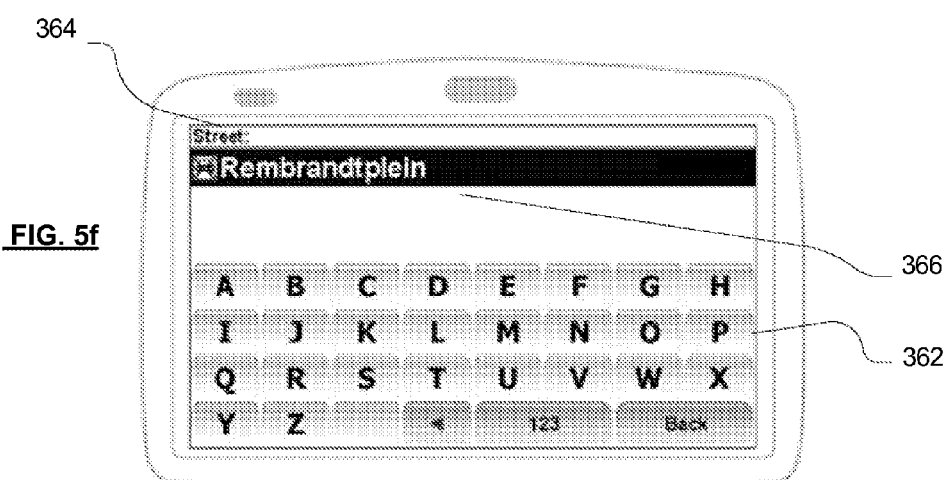

The user in this instance wishes to navigate to Amsterdam, and on selection of Amsterdam from the list 360 the PND displays, as shown in FIG. 5f, a virtual keyboard 362 by means of which a user can input street names, a prompt 364 for entry of a streetname 364 and, in this instance, as the user has previously navigated to a street in Amsterdam, a list 366 of selectable streets in Amsterdam.

In this example the user wishes to return to the street, Rembrandtplein, that they have previously visited and so selects Rembrandtplein from the displayed list 366.

Figure 5G:
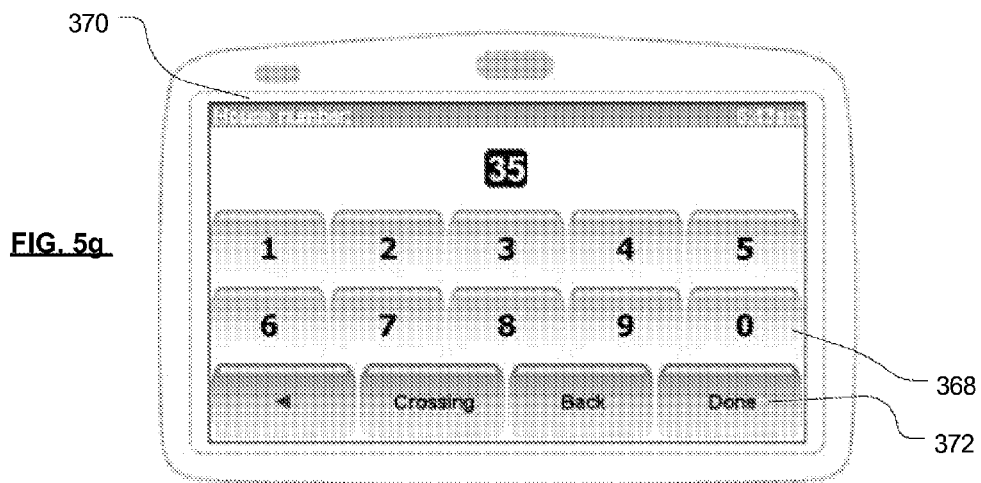

Once a street has been selected, the PND then displays a smaller virtual keypad 368 and prompts the user, by means of prompt 370, to enter the number of the house in the selected street and city that they wish to navigate to. If the user has previously navigated to a house number in this street, then that number (as shown in FIG. 5g) is initially shown. If, as in this instance, the user wishes to navigate to No. 35, Rembrandtplein once again, then the user need only touch a "done" virtual button 372 displayed at the bottom right hand corner of the display. If the user should wish to navigate to a different house number in Rembrandtplein, then all they need do is operate the keypad 368 to input the appropriate house number.

Figure 5H:
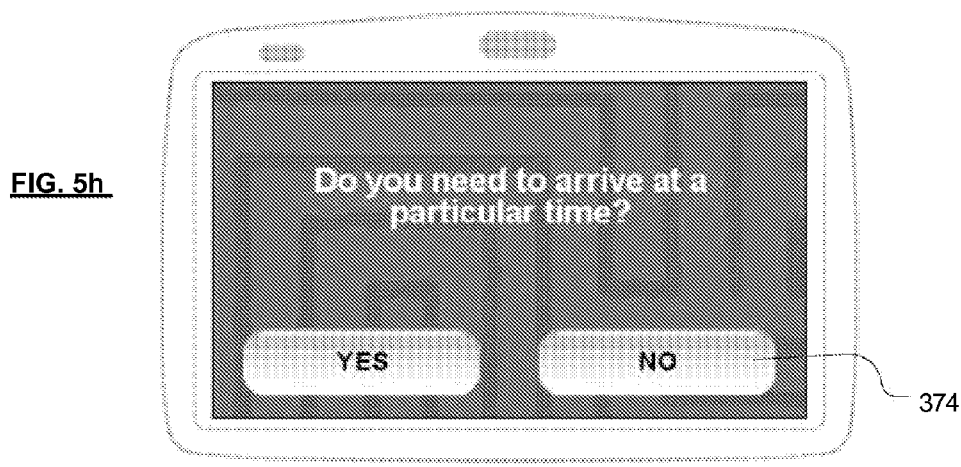

Once the house number has been input, the user is asked in FIG. 5h, whether they wish to arrive at a particular time. If the user should push the "yes" button, then functionality is invoked that estimates the time required to travel to the destination and advises the user when they should leave (or if they are running late, should have left) their current location in order to arrive at their destination on time. In this instance the user is not concerned about arriving at a particular time and hence selects the "no" virtual button.

Figure 5I:
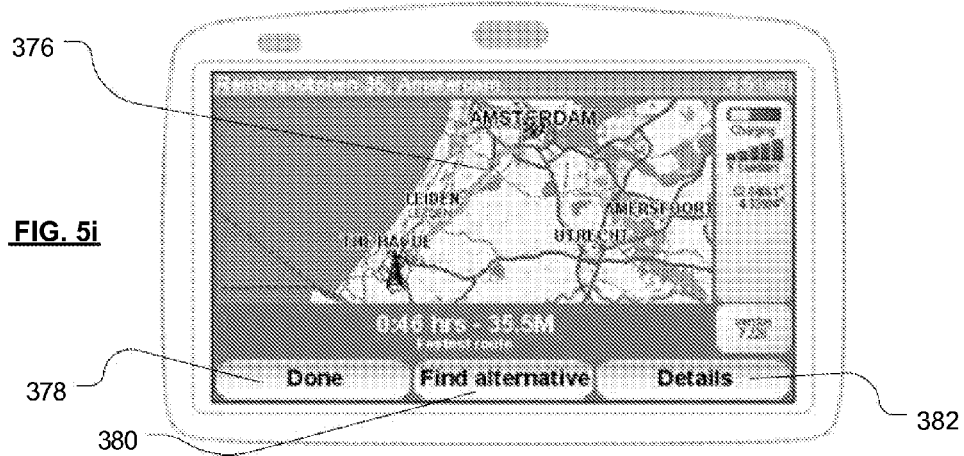

Selecting the "no" button 374 causes the PND to calculate a route between the current location and the selected destination and to display that route 376, as shown in FIG. 5i, on a relatively low magnification map that shows the entire route. The user provided with a "done" virtual button 378 which they can press to indicate that they are happy with the calculated route, a "find alternative" button 380 that the user can press to cause the PND to calculate another route to the selected destination, and a "details" button 382 that a user can press to reveal selectable options for the display of more detailed information concerning the currently displayed route 376.

Figure 6:
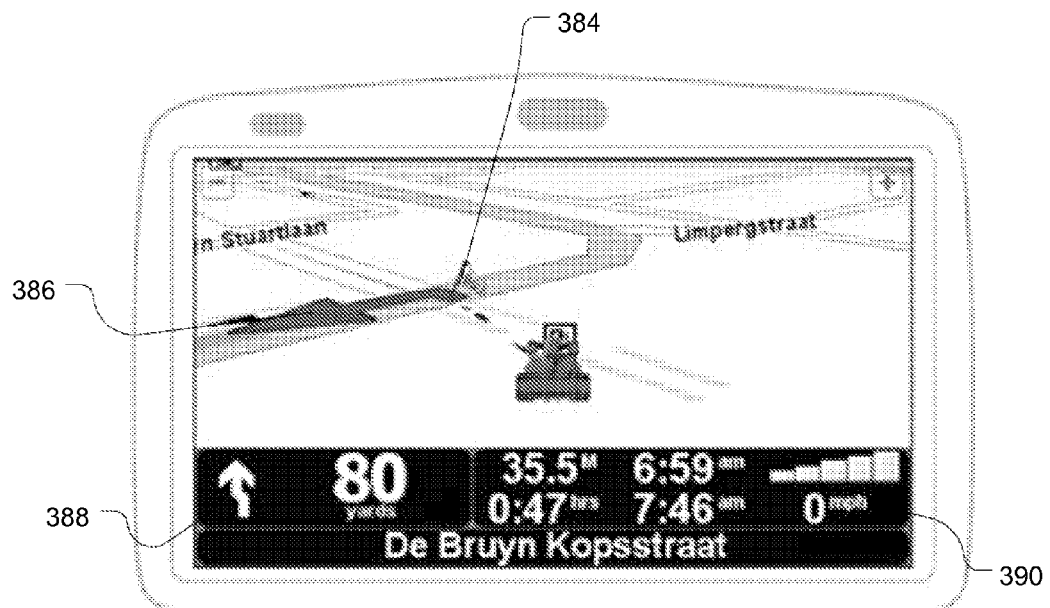
FIG. 6 is an illustrative screenshot from a PND depicting a start location for an illustrative calculated route.

In this instance it is assumed that the user is happy with the displayed route, and once the "done" button 378 has been pressed the user is presented, as shown in FIG. 6, with a pseudo three-dimensional view of the current, start, location for the PND. The display depicted in FIG. 6 is similar to that shown in FIG. 5a except that the displayed local environment 342 now includes a start location flag 384 and a waypoint indicator 386 indicating the next manoeuvre (in this instance, a left hand turn). The lower part of the display has also changed and now displays the name of the street in which the PND is currently located, an icon 388 indicating the distance to and type of the next manoeuvre (from the current location of the PND), and a dynamic display 390 of the distance and time to the selected destination.

The user then commences their journey and the PND guides the user, in a known manner, by updating the map in accordance with determined changes in PND location, and by providing the user with visual and, optionally, audible navigation instructions.

Figure 7:
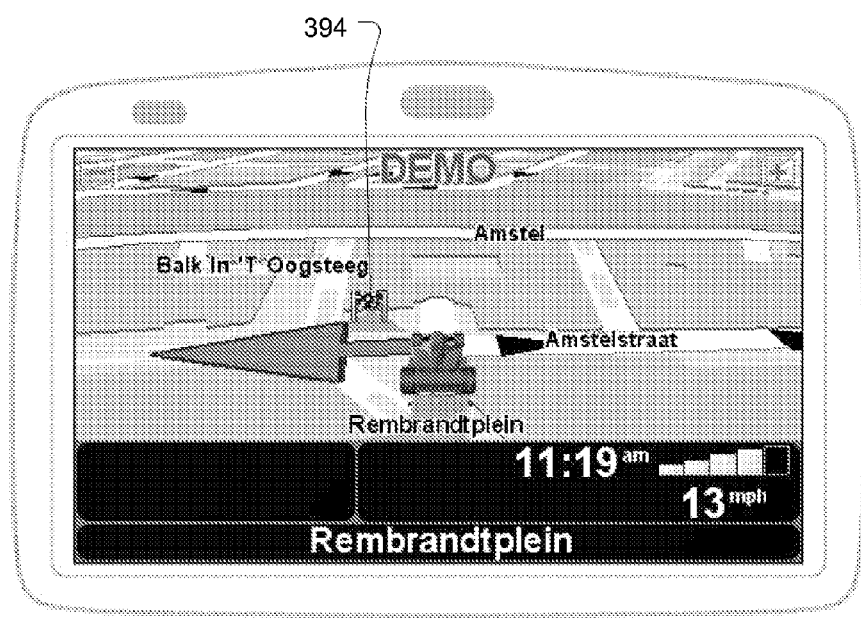
FIG. 7 is an illustrative screenshot from a PND depicting a destination location for the aforementioned calculated route.

FIG. 7 is a schematic representation of the destination (in this instance: Rembrandtplein, 35) as denoted by the chequered flag 394.

Figure 8:
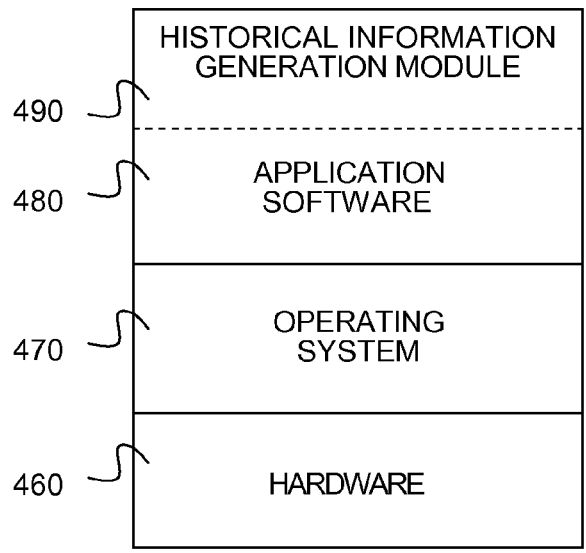
FIG. 8 is a schematic representation of the software employed by the navigation device.

Referring now to FIG. 8 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a historical information generation module 490, the function of which will now be described in detail in connection with FIG. 10.

Figure 9:
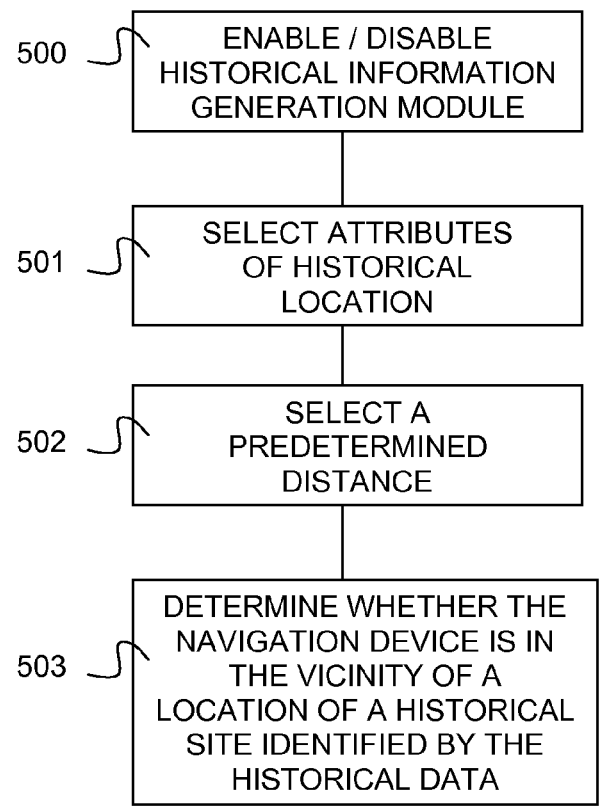
FIG. 9 is an illustrative flow diagram depicting method steps of an embodiment of the invention.

FIG. 9 is a schematic flow diagram illustrating steps of a method by which the teachings of the present invention, in particular the functionality of the aforementioned historical information generation module, may be implemented. The method that will now be described is particularly relevant to a navigation device 200 that comprises a PND which is being used by a user who wishes to navigate along a route to a destination location. This notwithstanding, it will also be apparent that the following method may, with minor modifications, be used in a variety of different circumstances including generating routes and navigation guidance from a desktop computer.

In step 500, the user selects whether she/he wishes to receive historical information during travel. This may be carried out before or after a navigable route has been calculated and may be presented as an additional option (not shown) in the menu. If the user selects that she/he does not want to receive historical information, the historical information generation module is switched off and no historical information is provided during the journey. If the user selects that she/he does want to receive historical information then in step 501, the processor 210 causes the display to display a request for a selection of one or more attributes of historical sites that is of interest to the user. For example the user may be provided with a list of possible types of historical sites that the user can receive historical information on, such as historical buildings, battlefields, geological sites, archaeological sites, historical event from a particular time period e.g. middle ages, Roman empire; prehistoric, 1800s, etc, types of historical event, e.g. religious, scientific, technological, art, political, military, language; or other suitable attribute. This may be achieved through a number of menus. On receiving a user selection of one or more attributes, the processor 210 stores in memory 230 a record of the user selection and moves to step 502.

In step 502, the processor 210 causes the display to display a request for a selection of a predetermined distance from a historical site at which the user wants the navigation device to provide historical information, for example, 10 m, 100 m, 500 m. In one embodiment, the navigation device may request the user to indicate how he is travelling and automatically set the predetermined distance based on the users response, for example, if the user is travelling by car, the predetermined distance may be set at 500 m, whereas if the user is travelling by foot, the predetermined distance may be set at 10 m. On receiving a user selection by user interface/input device 220, the processor 210 stores in memory 230 a record of the user selection and moves to step 503.

In step 503, the processor 210 receives from GNSS receiver 250, position fixes which the processor 210 map matches to map data stored in memory 230 in order to determine a current location on the map data of the navigation device 200. For example, a set of position fixes may be obtained from the GNSS receiver 250 and the set of position fixes may be matched to the nearest navigable route of the map data, for example road, path, canal, etc, that approximately corresponds to that set of position fixes. As the user moves with the navigation device the current position of the navigation device in the map data is updated. The current position of the navigation device may be displayed to the user on display device 240 as a perspective view of the local vicinity, such as that shown in FIGS. 5a, 6 and 7.

If a determined current location is within the selected predetermined distance of a location of a historical site for which the memory 230 has historical data and the historical site has at least one of the attributes that is of interest to the user, the processor (210) controls the audio output device 260 to convey the historical information as an audio output. For example, in step 504 the processor 210 may compare the current location of the navigation device with the locations identified by the location identifiers of the historical data and if the current location corresponds to one of these locations taking into account the predetermined distance selected by the user, the processor identifies the historical site as a possible point of interest. The processor in step 505, then determines, for the identified point of interest, whether an attribute of the point of interest indicated by the type identifier corresponds to an attribute of interest identified by the user. If it does, in step 506, the processor 210, controls the audio output device 260 to convey the historical information stored in memory 230 associated with that place of interest as an audio output. The audio output may be generated by a text to speech generator (not shown) of the navigation device.

In this way, the navigation device automatically provides historical information to a user when the navigation device is in the proximity of a historical location of interest, which may increase the utility of the navigation device to the user.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, the navigation device may be considered to be in the vicinity of the location identified by the location identifier if the navigation device is at the same location on a navigable route as the location identified by the location identifier.

The predetermined distance from the historical location at which the navigation device conveys the information may be fixed Alternatively the navigation device may be considered to be in the vicinity of the location identified by the location identifier if the location identified by the location identifier is considered to be in view from a current location of the navigation device. For example, the location identifier may identify from which locations on navigable routes the historical location can be seen and the processor is arranged to control the audio output device to convey the historical information when the navigation device is at one of these locations on the navigable routes.

The historical information may be displayed as text on the display device 240 as well or alternatively from by output as audio. Additionally or alternatively, images may be displayed in conjunction with the audio output/display of text. For example, images of historic figures or artefacts associated with the historical site. This may be advantageous when the user is not a driver of a vehicle. For example, if the user is walking.

Rather than determining a route based on a destination input by the user, the navigation device may have the option of the user selecting a type of historical location that she/he would like to visit and the processor is arranged to determine a navigable route based on the selected type of historical location. For example, the user may select a type of historical location, such as battlefields and the navigation device may determine a route via the battlefields within the predefined local area, for example, battlefields within 30 km of the current location. In this way, the user does not require knowledge of the location of the historical site or even the name of the historical site in order to obtain directions.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system.

Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

The invention claimed is:

1. A navigation device comprising:
   a locator for determining a location of the navigation device;
   a processor;
   at least one of an audio output device and a display controllable by the processor; and
   a store for map data and historical data, said historical data comprising historical information about a location and a location identifier identifying the location,
   wherein said processor is arranged to control at least one of the audio output device and display to convey the historical information as at least one of an audio and visual output in response to the processor determining from the locator that the navigation device is in the vicinity of the location identified by the location identifier; and
   wherein the navigation device is considered to be in the vicinity of the location identified by the location identifier if the navigation device is within a predetermined distance of the location identified by the location identifier, said predetermined distance being set by a user.

2. A navigation device according to claim 1, wherein the processor is arranged to map position fixes obtained via the locator to the map data.

3. A navigation device according to claim 2, wherein the location identifier of the historical data identifies a location on the map data and the processor determines that the navigation device is in the vicinity of the location identified by the location identifier by map matching the position fixes of the locator to the map data, determining a current location of the navigation device on the map data and determining whether the current location on the map data is in the vicinity of the location on the map data identified by the location identifier of the historical data.

4. A navigation device according to claim 1, wherein the navigation device is considered to be in the vicinity of the location identified by the location identifier if the navigation device is at the same location on a navigable route as the location identified by the location identifier.

5. A navigation device according to claim 1, wherein the processor is arranged to cause the display to display a request for the predetermined distance and configure an input interface to receive a selection of a predetermined distance.

6. A navigation device according to claim 1, wherein the navigation device is considered to be in the vicinity of the location identified by the location identifier if the location identified by the location identifier is considered to be in view from a current location of the navigation device.

7. A navigation device according claim 6, wherein the location identifier identifies from which locations on navigable routes of the map data the historical location can be seen and the processor is arranged to control at least one of the audio output device and display to convey the historical information when the navigation device is at one of these locations on the navigable routes.

8. A navigation device according to claim 1, wherein the historical data comprises a type identifier identifying one or more attributes (other than location) of the historical location.

9. A navigation device according to claim 8, wherein the processor is arranged to control at least one of the audio output device and display to convey historical information based on the type identifier associated with that historical information.

10. A navigation device according to claim 9, wherein the processor is arranged to cause the display to display a request for a selection of one or more attributes of historical sites that is of interest to the user and configure the input interface to receive a selection of the one or more attributes.

11. A navigation device according to claim 10, wherein, in response to the selection, the processor is arranged to only convey historical information having one or more, or even all, of the attributes selected by the user.

12. A navigation device according to claim 8, wherein the input interface is configured to enable a user to select a destination and the processor is arranged to determine a navigable route based on the selected destination and identify historical locations in the vicinity of the planned route.

13. A navigation device according to claim 8, wherein the input interface is configured to enable a user to select a type of historical location that she/he would like to visit and the processor is arranged to determine a navigable route based on the selected type of historical location.

14. A server comprising memory having stored thereon historical data comprising historical information about a location and a location identifier identifying the location on map data that is used by a navigation device to determine a navigable route, a communication link for communicating with a navigation device according to claim 1 and a processor arranged to send historical data to the navigation device.

15. A data carrier having stored thereon instructions that, when executed by a processor of a navigation device comprising:
   a locator for determining a location of the navigation device;
   at least one of an audio output device and a display controllable by the processor; and
   a store for map data and historical data, said historical data comprising historical information about a location and a location identifier identifying the location, causes the processor to control at least one of the audio output device and display to convey the historical information as at least one of an audio and visual output in response to the processor determining from the locator that the navigation device is in the vicinity of the location identified by the location identifier, wherein the navigation device is considered to be in the vicinity of the location identified by the location identifier if the navigation device is within a predetermined distance of the location identified by the location identifier, said predetermined distance being set by a user of the navigation device.

* * * * *